United States Patent [19]
Santo

[11] Patent Number: 4,995,633
[45] Date of Patent: Feb. 26, 1991

[54] STRUT TYPE SUSPENSION

[75] Inventor: Toshiyasu Santo, Susono, Japan

[73] Assignee: Toyota Jidosha Kabushiki Kaisha, Japan

[21] Appl. No.: 401,878

[22] Filed: Aug. 31, 1989

[30] Foreign Application Priority Data

Sep. 5, 1988 [JP] Japan ............................... 63-220409
Dec. 27, 1988 [JP] Japan ............................... 63-330582
Feb. 8, 1989 [JP] Japan ................................... 1-27589

[51] Int. Cl.$^5$ ............................................. B60G 3/20
[52] U.S. Cl. .................................... 280/673; 280/693
[58] Field of Search ............... 280/660, 668, 673, 675, 280/690, 691, 693, 696, 701

[56] References Cited

U.S. PATENT DOCUMENTS

| 3,068,022 | 12/1962 | Fiala. | |
|---|---|---|---|
| 4,132,431 | 1/1979 | von der Ohe | 280/691 |
| 4,313,617 | 2/1982 | Muramatsu et al. | |
| 4,377,298 | 3/1983 | Finn et al. | |
| 4,655,474 | 4/1987 | Sautler | 280/696 |
| 4,786,075 | 11/1988 | Takahashi | 280/696 |
| 4,844,505 | 7/1989 | Higuchi. | |

FOREIGN PATENT DOCUMENTS

| 2420317 | 11/1975 | Fed. Rep. of Germany | 280/691 |
|---|---|---|---|
| 512140 | 1/1955 | Italy | 280/690 |
| 61-169306 | 7/1986 | Japan | 280/701 |
| 87/04125 | 7/1987 | PCT Int'l Appl. | 280/668 |
| 1049268 | 10/1983 | U.S.S.R. | 280/675 |

Primary Examiner—Charles A. Marmor
Assistant Examiner—Karin Tyson
Attorney, Agent, or Firm—Oliff & Berridge

[57] ABSTRACT

A strut type suspension, in which a strut has an upper strut portion swingably connected to a vehicle body and a lower strut portion swingably connected to a suspension arm, includes a wheel carrier and a control link. The wheel carrier has an upper portion located above a rotary axis of a wheel and swingably connected to the lower strut portion through a ball joint and a lower portion located below the rotary axis. The control link has one end swingably connected to the suspension arm and the other end swingably connected to the lower portion of the wheel carrier. The connection point of the control link and the suspension arm is provided in a such a position as to be displaced outward in a lateral direction of the vehicle body as the suspension arm is swung in a bounding direction from a reference condition.

9 Claims, 20 Drawing Sheets

STRUT TYPE SUSPENSION

BACKGROUND OF THE INVENTION

1. Field of the Invention

This invention relates to a strut type suspension of a vehicle and, more particularly, to a suspension used for a front wheel suspension and connected with a steering gear.

2. Description of the Prior Art

A strut type suspension is so structured that a strut has an upper strut portion and a lower strut portion capable of sliding relative to the upper strut portion, the upper strut portion is swingably connected to a vehicle body and the lower strut portion is swingably connected to a suspension arm extending in a lateral direction of the vehicle body.

Since the above suspension has features that the number of points mounted on the vehicle body is small and a lateral member is limited only to the suspension arm, it has the advantages that an input to the vehicle body is small, an accuracy in working hardly affects suspension geometry, and a lateral special restrictions are few. On the contrary, the suspension involves a problem that a change in camber of a tire is small in bounding, so that a camber to the ground of a turning outer wheel is enlarged at the positive side.

There are various proposals in order to enlarge the change in chamber of the tire in bounding. For instance, there are a proposal disclosed in Japanese Patent Public Disclosure (KOKAI) No. 56-82613 as shown in FIG. 21 and that disclosed in Japanese Patent Public Disclosure (KOKAI No. 63-28707 as shown in FIG. 22.

In a suspension as shown in FIG. 21, an upper strut portion 21 of a strut 20 is swingably connected to a vehicle body 23, and a lower strut portion 22 capable of sliding relative to the upper strut portion 21 is swingably connected to a suspension arm 24 extending in a lateral direction of the vehicle body. A portion of a wheel carrier 25 located above a rotary axis of a wheel is swingably connected to an assist link 27 through a ball joint 26. This assist link 27 is swingably connected to the lower strut portion 22, and a portion of the wheel carrier 25 located below the rotary axis is swingably connected to the suspension arm 24 through a ball joint 28.

In a suspension as shown in FIG. 22, the upper strut portion 21 of the strut 20 is swingably connected to the vehicle body 23, and the lower strut portion 22 is swingably connected to an upwardly extending portion of an L-shaped suspension arm 30 extending in the lateral direction of the vehicle body and upwardly. A portion of a wheel carrier 31, the wheel carrier 31 being formed into a substantially reversed C-shape as viewed from the back, located above a rotary axis is swingably connected to the lower strut portion 22, and a portion of the wheel carrier 31 located below the rotary axis is swingably connected to the corner of the suspension arm 30.

Now, in order to cope with the development of high-performance of a front wheel drive car, which is a so-called FF car, for example, the development of high performance through mounting a high output engine, it is necessary for each front wheel to restrain as much as possible from tending to rotate around a steering axis, that is, a kingpin axis at a time of rapid acceleration or deceleration to thereby ensure controllability.

The front wheel tends to rotate rearward around the kingpin axis by means of a braking force acting on the center of a grounding contact surface of the tire, and also tends to rotate forward around the kingpin axis by means of a driving force acting on a point intersecting the rotary axis of the tire and an imaginary vertical plane passing through the center of the grounding contact surface of the tire each other. The degree of rotation produced by the braking force varies according to the amount of a kingpin offset which is defined by a distance between the intersection of the kingpin axis and the ground surface and the center of the grounding contact surface of the tire. Also, the degree of rotation produced by the driving force varies according to the amount of a distance between the intersection of the imaginary vertical plane passing through the center of the grounding contact surface of the tire and the rotary axis of the tire and the kingpin axis, the distance being a so-called IK distance. In order to restrain the front wheel from tending to rotate around the kingpin axis as far as possible, the kingpin offset and the IK distance should be brought to zero or as close as possible to zero.

The kingpin axis in the case of FIG. 21 is provided as a line connecting the center of the ball joint 26 with the center of the ball joint 28. As is apparent from the drawing, the ball joints 26, 28 may be disposed so as to locate outward in the lateral direction of the vehicle body in order to bring the kingpin offset $L_1$ to zero and also bring the IK distance $L_2$ as close as possible to zero.

On the other hand, the link 27 should be shortened in order to enlarge the change in a camber angle having a negative tendency. In order to shorten the link 27 and bring the kingpin offset and the IK distance to zero or as close as possible to zero, the lower ball joint 28 should be naturally disposed outward in the lateral direction of the vehicle body.

However, in condition that the ball joint 28 is located outward in the lateral direction of the vehicle body, when the swing angle of the ball joint 28 relative to the wheel carrier 25 is large during the swing of the suspension arm 24, interference of the ball joint 28 with the wheel or a brake device provided on the wheel carrier occurs, so that such interference should be avoided. As a result, it is limited to dispose the ball joint 28 outward of the vehicle body.

The suspension shown in FIG. 22 involves the similar problems.

SUMMARY OF THE INVENTION

An object of the present invention is to provide a strut type suspension capable of enlarging a change in camber, wherein a swing angle of a ball joint provided in a wheel carrier and disposed below a rotary axis of a wheel may be reduced, a kingpin offset may be substantially brought to zero and an IK distance may be lessened as small as possible.

Another object of the present invention is to provide a strut type suspension capable of enlarging a change in camber while capable of enlarging a caster angle in bounding.

According to the present invention, there is provided a strut type suspension, in which a strut has an upper strut portion and a lower strut portion capable of sliding relative to the upper strut portion, the upper strut portion is swingably connected to a vehicle body, and the lower strut portion is swingably connected to a suspension arm extending in a lateral direction of the vehicle body, comprising a wheel carrier having an upper portion located above a rotary axis of a wheel and a lower portion located below the rotary axis, the upper portion being swingably connected to the lower strut portion through a ball joint, and a control link having one end swingably connected to the suspension arm and the other end swingably connected to the lower portion of the wheel carrier, wherein a connection point of the control link and the suspension arm is provided in such a position as to be displaced outward in the lateral direction of the vehicle body as the suspension arm is swung from a reference condition in a bounding direction.

According to one aspect of the present invention, the lower strut portion is connected to the suspension arm to be swingable around an axis extending in a longitudinal direction of the vehicle body. According to another aspect, the lower strut portion is connected to the suspension arm to be swingable around an axis extending in the longitudinal direction of the vehicle body and an axis extending in the lateral direction of the vehicle body. According to a further aspect, the lower strut portion is swingably connected to the suspension arm through a ball joint. In this case, a second control link is connected on one hand to the lower strut portion and on the other hand to the suspension arm or to the vehicle body through respective ball joints.

Two preferable embodiments are provided by the present invention. In one embodiment, the control link has one end, that is, an inner end making a turning pair with the suspension arm, and the other end, that is, an outer end making a spherical turning pair with the wheel carrier. In this embodiment, the kingpin axis is provided as a line connecting the center of the ball joint disposed at the upper portion of the wheel carrier with the center of the ball joint disposed at the lower portion of the wheel carrier.

In another embodiment, the control link consists of two rods. Each rod has an inner end making a spherical turning pair with the suspension arm and an outer end making a spherical turning pair with the wheel carrier. In this embodiment, the kingpin axis is provided as a line connecting the center of the ball joint disposed at the upper portion of the wheel carrier with the intersection of extensions of two axes of the rods, the kingpin axis being a so-called imaginary kingpin axis.

When the tire bounds to swing the suspension arm, the strut swings and at the same time the control link pushes the lower portion of the wheel carrier outward in the lateral direction of the vehicle body. While the outward pushing of the control link makes the wheel carrier swing about the upper ball joint, the swing of the strut is added to the wheel carrier, so that the tire is subjected to change in camber toward the negative side in bounding.

When the tire bounds to swing the suspension arm, in the suspension as shown in FIG. 21, for example, the lower ball joint swings by an angle approximately equal with the swing angle of the suspension arm. However, according to the present invention, since the control link is pushed outward in the lateral direction with the swing of the suspension arm, the ball joint located at the connection of the control link and the wheel carrier is displaced substantially in the lateral direction to lessen the swing angle of the ball joint.

Since the tire in bounding is subjected to large negative change in camber, the tire may be uniformly brought into contact with the road surface.

Since the swing angle of the ball joint located at the lower portion of the wheel carrier is lessened, the ball joint may be disposed in the lateral direction of the vehicle body as outward as possible without any interference with a wheel brake device. As a result, the kingpin offset may be brought to zero and the IK distance may be shortened as small as possible. Accordingly, when the front wheel receives the braking force or driving force, it is possible to restrain the front wheel from tending to rotate around the kingpin axis, so that high performance may be achieved while improving controllability.

Since the kingpin axis may be set independently, the degree of freedom in design of suspension geometry may be increased.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
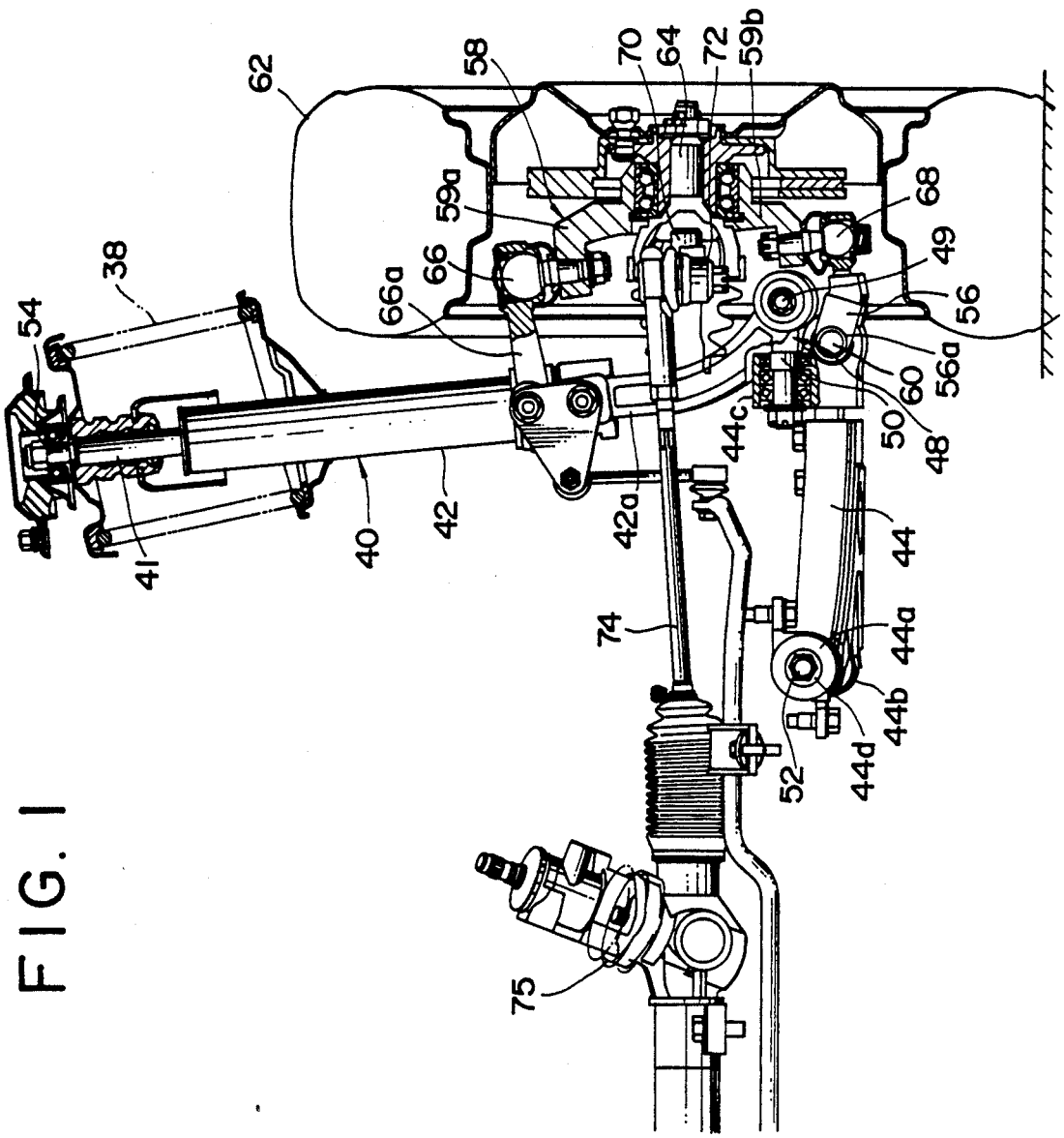
FIG. 1 is a rear view, partly broken-away, showing a strut type suspension according to the present invention.
Figure 2:
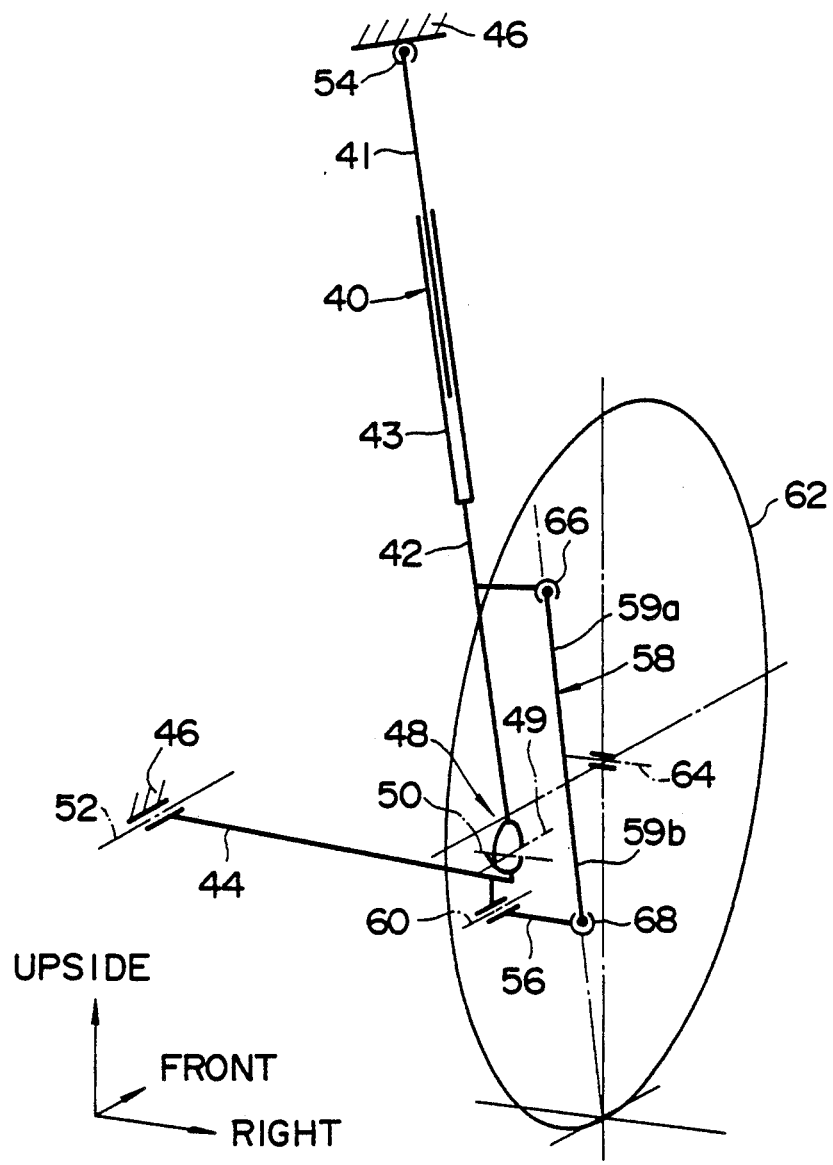
FIG. 2 is a schematic view showing the basic configuration of the suspension shown in FIG. 1.

A strut type suspension according to the present invention is basically structured as shown in FIG. 2. In this suspension, a strut 40 is a shock absorber of a structure well known per se, and has an upper strut portion 41 and a lower strut portion 42 capable of sliding relative to the upper strut portion. A coil spring 38 (See FIG. 1) is disposed between the upper and lower strut portions 41, 42. A suspension arm 44, lower and upper strut portions 42, 41 and a vehicle body 46 constitute a first quadric link mechanism.

The lower strut portion 42 is connected to the suspension arm 44 through universal joint means 48. The universal joint means 48 is rotatable around a shaft 49 extending in a longitudinal direction of the vehicle body and a shaft 50 extending in a lateral direction of the vehicle body. The shaft 49 does not necessarily extend in parallel with a shaft 52, on which the suspension arm 44 and the vehicle body 46 make a turning pair with each other. Further, an axis of a cylinder 43, on which the upper strut portion 41 and the lower strut portion 42 make a sliding pair with each other, passes through a support 54, on which the upper strut portion 41 and the vehicle body 46 make a spherical turning pair with each other. The axis of the cylinder 43 is not required to be within a plane perpendicular to the axis of the shaft 49 and that of the shaft 52.

The suspension arm 44, a control link 56, a wheel carrier 58 and the lower strut portion 42 constitute a second quadric link mechanism. In this quadric link mechanism, the suspension arm 44 and the control link 56 make a turning pair with each other about a shaft 60. This shaft 60 will do so long as it substantially extends in parallel with the shaft 49.

The wheel carrier 58 has a portion 59a located above a rotary shaft 64 of a tire 62 and a portion 59b located below the rotary shaft 64. A kingpin axis is provided as a line connecting the center of a ball joint 66, on which the upper portion 59a of the wheel carrier and the lower strut portion 42 make a spherical turning pair, with the center of a ball joint 68, on which the lower portion 59b of the wheel carrier and the control link 56 make a spherical turning pair.

FIG. 1 shows a working condition of the suspension shown in FIG. 2. The description of the structure of this suspension substantially identical with that in FIG. 2 will be omitted.

An inner portion of the suspension arm 44 is bifurcated and rubber bushings 44d are disposed on respective bifurcated portions 44a, 44b of the suspension arm 44. The suspension arm 44 is swingably connected to the vehicle body by the shaft 52 extending through these bushings. The turning pair of the suspension arm 44 and the vehicle body may be ensured by forming the suspension arm 44 by the use of a substantially straight rod, and connecting a strut bar (not shown) for restricting the longitudinal movement of the vehicle body with the wheel carrier 58.

The lower strut portion 42 is bifurcated and an arm 66a is extended from a portion above the bifurcated portions, the arm 66a supporting the ball joint 66. A rubber bushing (not shown) is disposed on each end of bifurcated portions 42a (in the drawing, only the rear end is shown) of the lower strut portion 42. The lower strut portion 42 is swingably connected to the shaft 49 extending through these bushings. On the other hand, the shaft 50 is united with the shaft 49 in a T-shape. This shaft 50 is rotatably supported by a bearing 44c provided on the suspension arm 44. Thus, the turning pairs of the lower strut portion 42 and the suspension arm 44 are ensured about the shafts 49, 50. In this case, the axis of the shaft 49 and that of the shaft 50 are not required to be within an identical plane.

The shaft 60 is supported in a portion of the suspension arm 44 located more laterally inward of the vehicle body than the shaft 49. An inner portion of the control link 56 is bifurcated. A rubber bushing (not shown) is disposed on each end of bifurcated portion 56a (in the drawing, only the rear end is shown), and the control link 56 is swingably connected to the suspension arm 44 by the shaft 60 extending through these bushings. Thus, the turning pair of the suspension arm 44 and the control link 56 is ensured about the axis 60.

The connection point of the suspension arm 44 and the control link 56 is provided in such a position as to be displaced outward in the lateral direction of the vehicle body as the suspension arm 44 is swung in a bounding direction from such a reference condition that the suspension arm 44 is neither bounded nor rebounded in a standard load. In the embodiment shown, the constitution as noted above is ensured by setting the level of the axis of the shaft 52 disposed in the connection of the suspension arm 44 and the vehicle body so as to be located above the level of the axis of the shaft 60. In this case, the axis of the shaft 60 is defined as the connection point.

The wheel carrier 58 is a steering knuckle, and a knuckle arm 70 is provided on the upper portion 59a of the wheel carrier. The knuckle arm 70 is connected to a tie rod 74 through a ball joint 72. The tie rod 74 is connected to a member like a rack bar of a steering gear 75 through a ball joint.

According to the aforementioned embodiment, since the lower strut portion 42 is connected to the suspension arm 44 through the universal joint means 48 rotatable around the shaft 49 extending in the longitudinal direction of the vehicle body and around the shaft 50 extending in the lateral direction of the vehicle body, the respective connections may be restrained from the generation of internal force, thereby ensuring the smooth movement, even if inaccuracies in working the strut 40 and the suspension arm 44 or the deformation of these parts due to external force occur.

Figure 3:
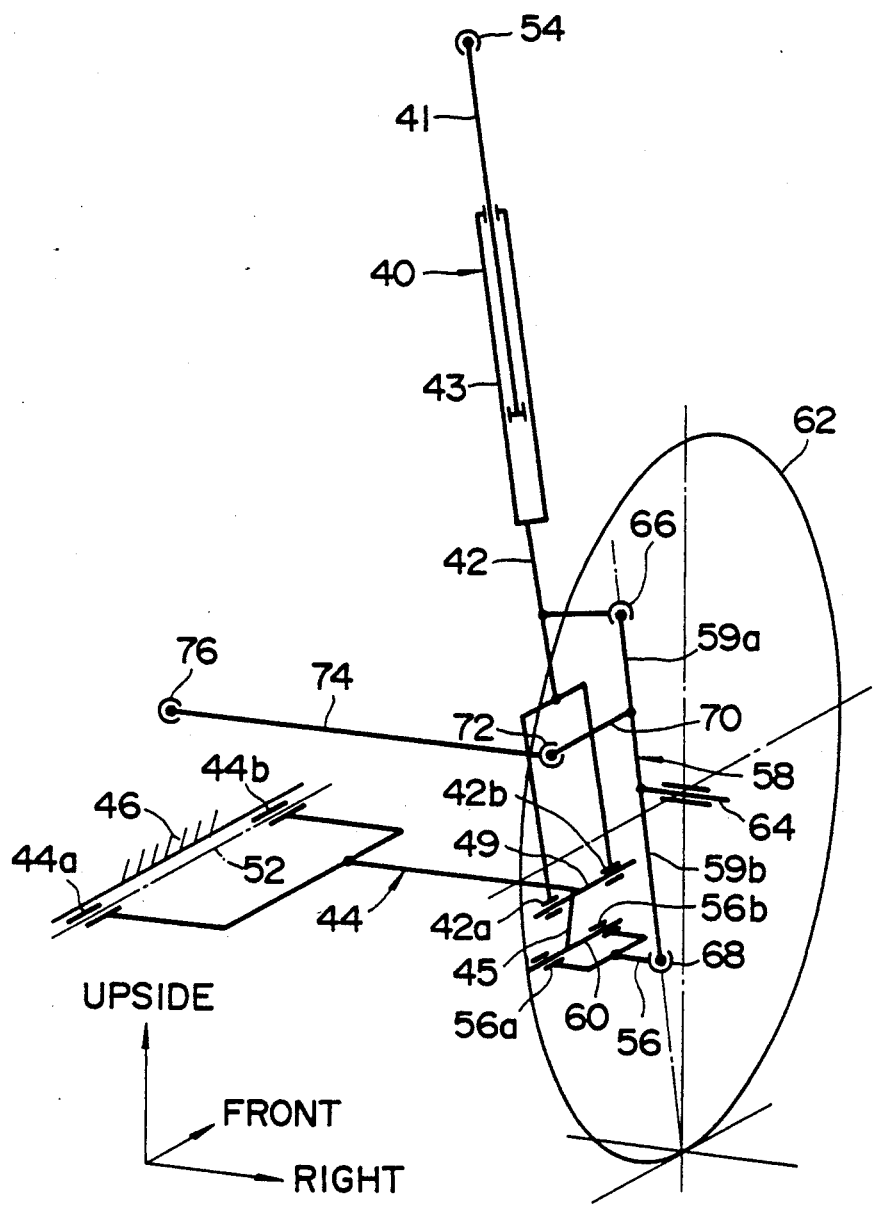
FIG. 3 is a schematic view showing another embodiment of the strut type suspension.

However, as shown in FIG. 3, the present invention may be worked so long as the lower strut portion 42 is connected to the suspension arm 44 to be swingable around the shaft 49 extending in the longitudinal direction of the vehicle body.

Referring to FIG. 3, rubber bushings (not shown) are disposed on respective bifurcated portions 44a, 44b of the suspension arm 44, and the suspension arm 44 is swingably connected to the vehicle body 46 by the shaft 52 extending through these bushings.

The lower strut portion 42 is bifurcated and rubber bushings (not shown) are disposed on respective bifurcated portions 42a, 42b of the lower strut portion 42. The lower strut portion 42 is swingably connected to the suspension arm 44 by the shaft 49 extending through these bushings.

A downwardly projecting bracket 45 is provided in a portion of the suspension arm 44 located more laterally inward of the vehicle body than the shaft 49. The shaft 60 is supported by the bracket 45. On the other hand, the control link 56 is bifurcated, and rubber bushings are disposed on respective bifurcated portions 56a, 56b of the control link 56. The control link 56 is swingably connected to the bracket 45, thus the suspension arm 44 by the shaft 60 extending through these bushings.

The connection point of the suspension arm 44 and the control link 56 is displaced outward in the lateral direction of the vehicle body as the suspension arm 44 is swung in the bounding direction from the reference condition. In the embodiment shown, the constitution as noted above is ensured by projecting the bracket 45 downward from the suspension arm 44 and then connecting the bracket 45 to the control link 56 through the shaft 60.

The knuckle arm 70 is provided on the upper portion 59a of the wheel carrier 58. The knuckle arm 70 is connected to the tie rod 74 through the ball joint 72, and the tie rod 74 is connected to a member like a rack bar of the steering gear (not shown) through a ball joint 76.

The suspensions shown in FIGS. 1 through 3 may enlarge a change in camber, and the kingpin offset may be brought substantially to zero and the IK distance may be lessened as small as possible.

However, when examining the above suspensions under a travelling condition, these suspensions involve the following problems. Namely, when the outer wheel is subjected to steering change in a toe-in direction in turning and the bounding condition is brought about, the camber angle should be settled as a negative value and it is necessary to make the camber angle largely change with the bounding in order to properly maintain the camber angle to the ground during the rolling of the vehicle body. However, when the bounding condition is brought about without any steering change in straight travelling, the change in camber should be lessened as small as possible in order to restrain the straight travelling property from degradation due to camber thrusts.

The suspensions as noted above have so large camber changes that the latter requirement is difficult to be satisfied. Then, it is considered that a caster angle is set to be a larger value to improve the straight travelling property and the degradation of straight travelling property accompanied by the large camber change is compensated for by the above improvement. However, when the caster angle is set to be a larger value, the straight stability in driving is damaged particularly in the case of FF car, so that it becomes difficult to set the caster angle.

Figure 4:
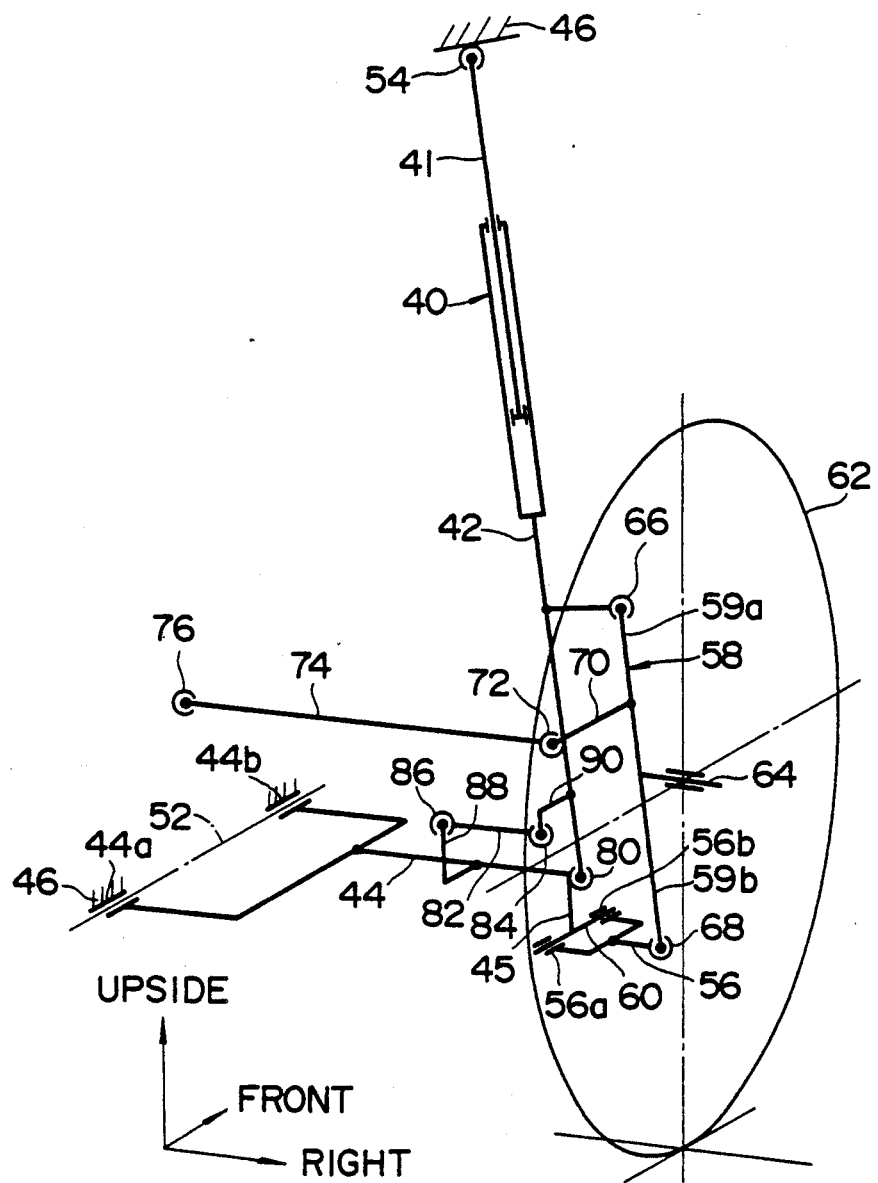
FIG. 4 is a schematic view showing a further embodiment of the strut type suspension.

The suspension as shown in FIG. 4 may enlarge the change in camber in bounding, and at the same time may enlarge the caster angle. In this embodiment, the same elements as those in the previously described embodiments are designated by the same reference numerals and the description thereof will be omitted.

The lower strut portion 42 and the suspension arm 44 make a spherical turning pair through a ball joint 80.

A second control link 82 and the lower strut portion 42 make a spherical turning pair through a ball joint 84, and the control link 82 and the suspension arm 44 make a spherical turning pair through a ball joint 86. Namely, a bracket 88 is provided on an intermediate portion of the suspension arm 44, and the ball joint 86 is supported by the bracket 88. On the other hand, a bracket 90 is provided on the lower strut portion 42, and the ball joint 84 is supported by the bracket 90.

The ball joint 86 and the control link 82 are disposed such that the ball joint 66 is moved to the rearward of the vehicle body to increase the caster angle when the tire 62 makes a bound stroke. Some examples of the arrangements of the ball joint 86 and the control link 82 are shown as follows.

Figure 5:
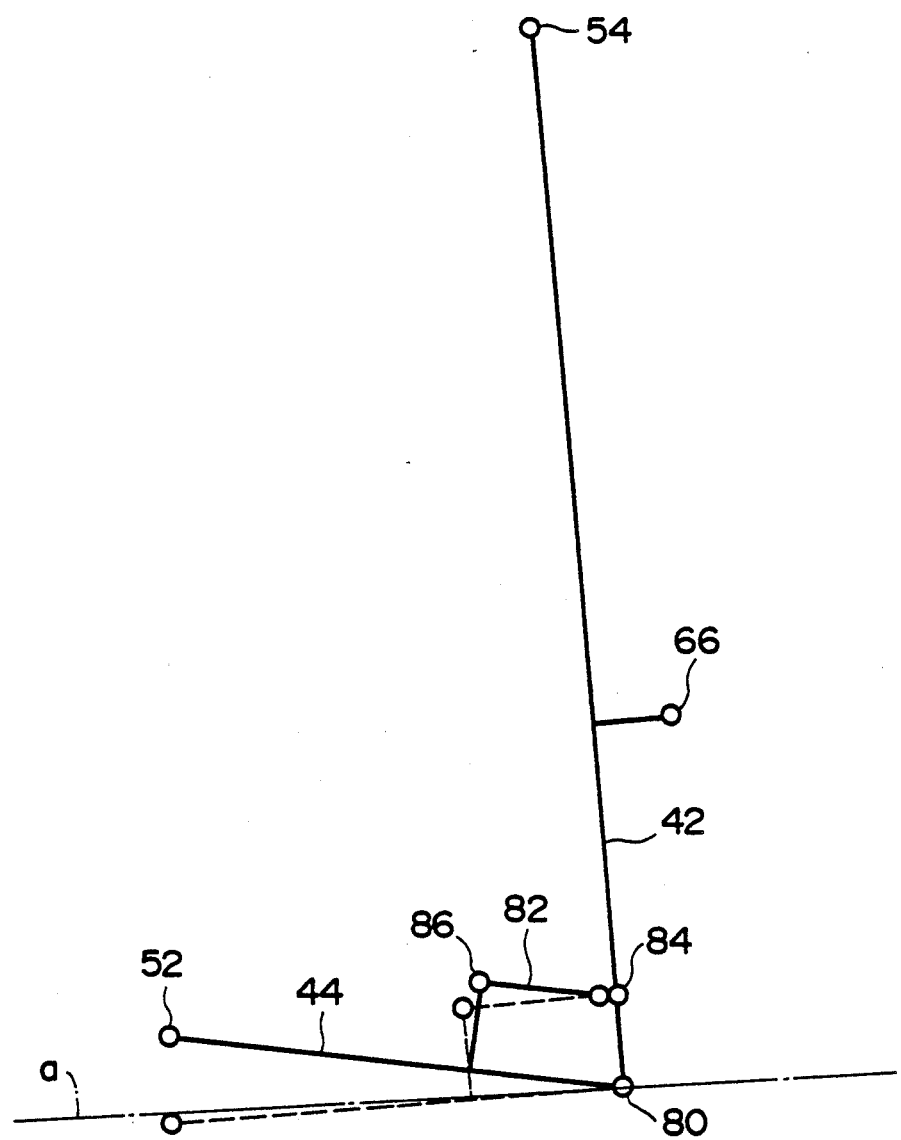
FIGS. 5 through 8 are schematic views showing arrangements of a second control link of the suspension shown in FIG. 4, respectively.

In an embodiment shown in FIG. 5, the ball joint 86 is disposed so as to be located above a straight line a which is perpendicular to a straight line connecting the center of the ball joint 80 with the center of the support 54 and which passes through the center of the ball joint 80. Further, the control link 82 is disposed to be located rearward of the vehicle (on this side in FIG. 5) relative to a plane including a perpendicular line drawn from the center of the ball joint 80 to the shaft 52 and the center of the support 54.

Figure 6:
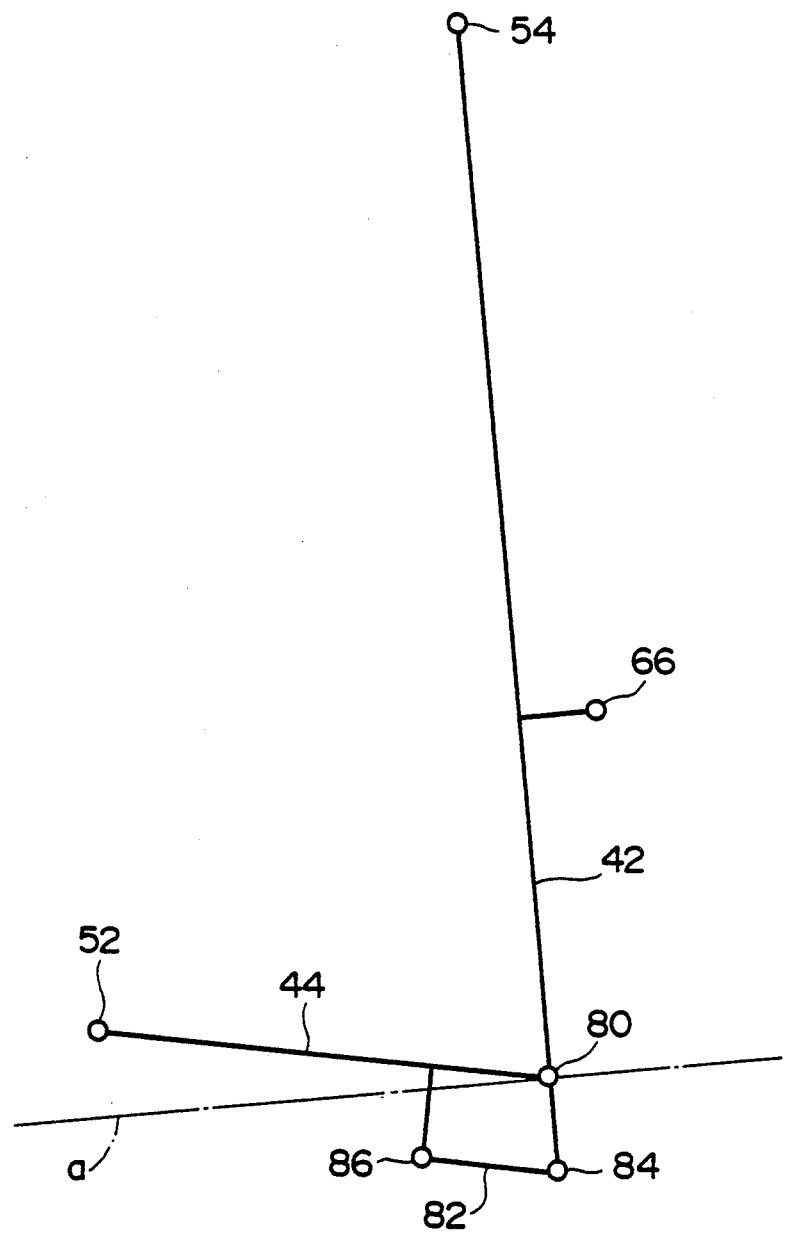

In an embodiment shown in FIG. 6, the ball joint 86 is located below the straight line a. Further, the control link 82 is disposed forward of the vehicle relative to the plane including the perpendicular line drawn from the center of ball joint 80 to the shaft 52 and the center of the support 54.

Figure 7:
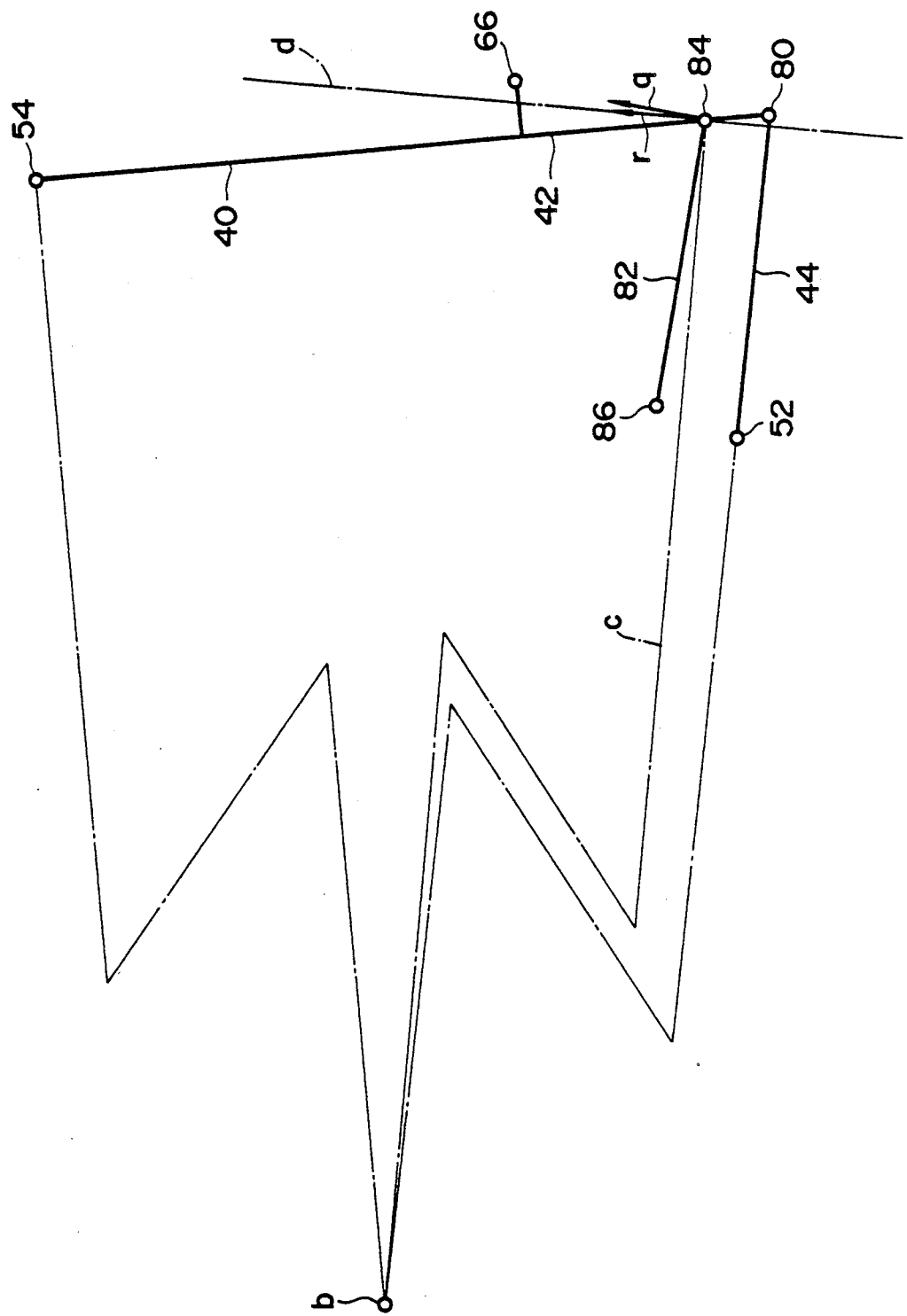

In an embodiment shown in FIG. 7, the ball joint 86 is disposed above a straight line c which connects the instantaneous center b of the lower strut portion 42 and the vehicle body with the center of the ball joint 84, and the ball joint 86 is located laterally inward of the vehicle body relative to a straight line d which passes through the center of the ball joint 84 and which is perpendicular to the straight line c. On the other hand, the control link 82 is located forward of the vehicle relative to the plane including the perpendicular line drawn from the center of the ball joint 80 to the shaft 52 and the center of the support 54.

Figure 8:
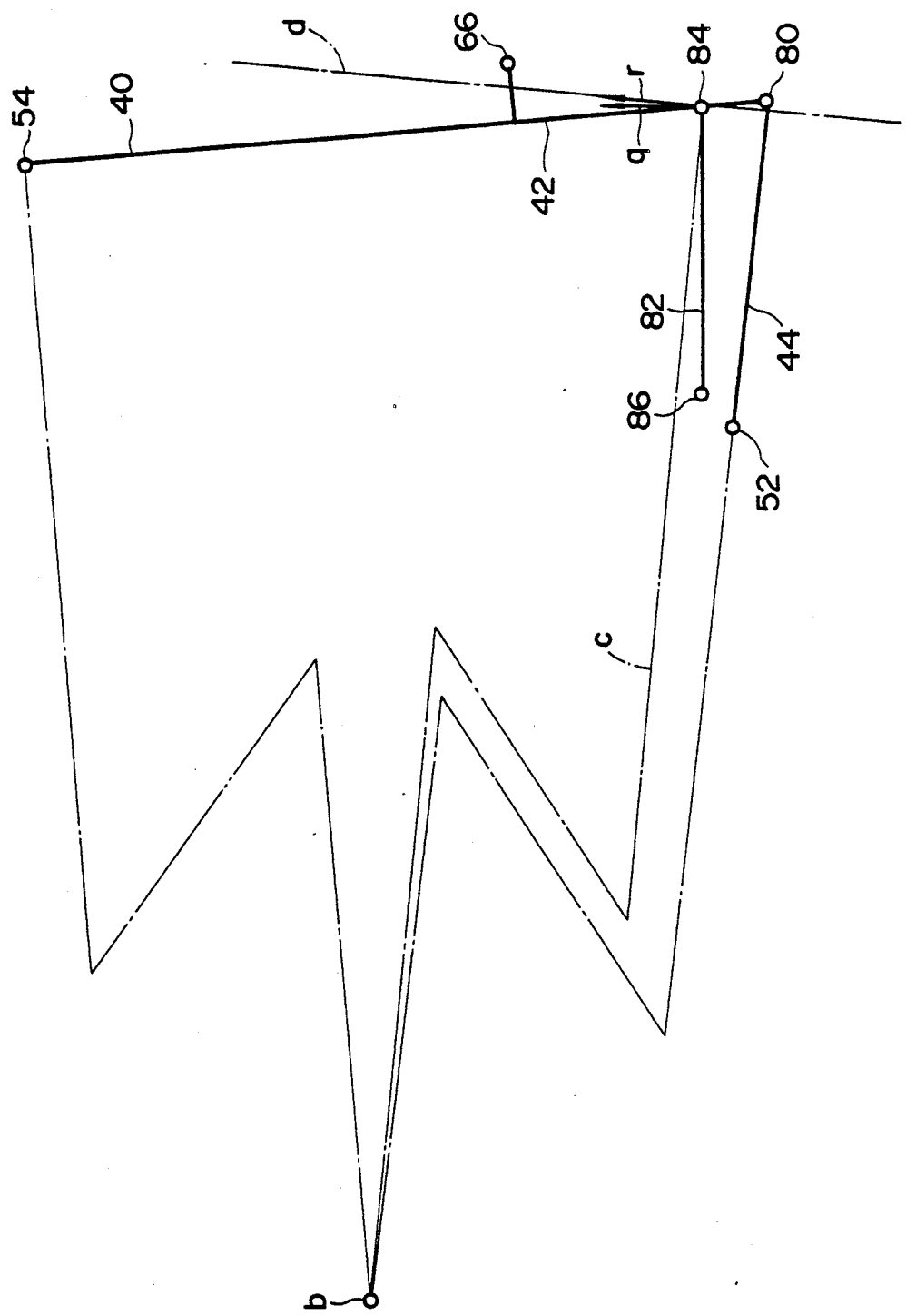

In an embodiment shown in FIG. 8, the ball joint 86 is located below the straight line c and more inward than the straight line d. The control link 82 is located rearward of the vehicle relative to the plane including the perpendicular line drawn from the center of the ball joint 80 to the shaft 52 and the center of the support 54.

Figure 9:
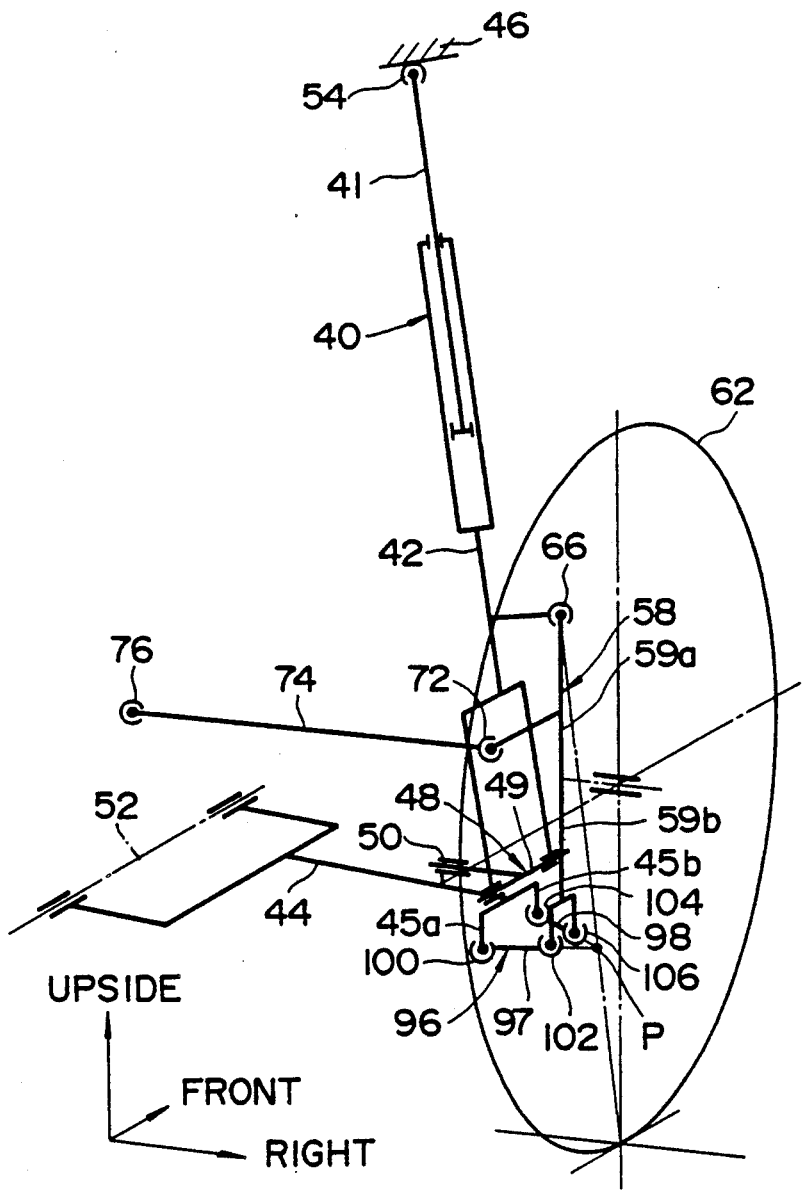
FIGS. 9 through 12 are schematic views showing still further embodiments of the strut type suspension, respectively.

Referring to FIG. 9 which illustrates another embodiment of the strut type suspension, the configuration different from that of the previously described suspensions will be explained. In the suspension shown in FIG. 9, the lower strut portion 42 is connected to the suspension arm 44 to be swingable around the axis 49 extending in the longitudinal direction of the vehicle body and the axis 50 extending in the lateral direction of the vehicle body.

A control link 96 consists of a first rod 97 and a second rod 98. Both rods 97, 98 are disposed on a substantially identical level as viewed from the back to be equivalent to a single control link. The suspension arm 44, the control link 96, the wheel carrier 58 and the lower strut portion 42 constitute a second quadric link mechanism.

The suspension arm 44, the first rod 97, the wheel carrier 58 and the second rod 98 constitute a third quadric link mechanism. In the quadric link mechanism, the interconnection of a straight line connecting the center of a ball joint 100, on which the first rod 97 and the suspension arm 44 make a spherical turning pair, with the center of a ball joint 102, on which the first rod 97 and the lower portion 59b of the wheel carrier 58 make a spherical turning pair, and a straight line connecting the center of a ball joint 104, on which the second rod 98 and the suspension arm 44 make a spherical turning pair, with the center of a ball joint 106, on which the second rod 98 and the lower portion 59b of the wheel carrier 58 make a spherical turning pair, becomes an imaginary rotary center P. The imaginary rotary center P as viewed from the back is determined so as to be located more laterally outward of the vehicle body than the ball joints 102, 106.

The kingpin axis is provided as a line connecting the center of the ball joint 66, on which the lower strut portion 42 and the upper portion 59a of the wheel carrier make a spherical turning pair, with the imaginary rotary center P.

The configuration for working the suspension shown in FIG. 9 is as follows.

Instead of the bracket, two arm portions 45a, 45b longitudinally spaced apart from each other are projected downward from the suspension arm 44. The arm portion 45a is connected to the first rod 97 through the ball joint 100, and the arm portion 45b is connected to the second rod 98 through the ball joint 104.

The lower portion 59b of the wheel carrier 58 is bifurcated. An end of one bifurcated portion of the lower portion 59a is connected to the first rod 97 through the ball joint 102, and an end of the other bifurcated portion is connected to the second rod 98 through the ball joint 106.

The connection point of the suspension arm 44 and the control link 96 is provided in such a position as to be displaced outward in the lateral direction of the vehicle body as the suspension arm 44 is swung in the bounding direction from the reference condition. In the embodiment shown, the above constitution is ensured by projecting two arm portions 45a, 45b downward from the suspension arm 44 and then connecting two rods 97, 98 of the control link 97 to these arm portions through the ball joints 100, 104, respectively. In this case, a line connecting the center of the ball joint 100 with the center of the ball joint 104 is the connection point.

Figure 10:
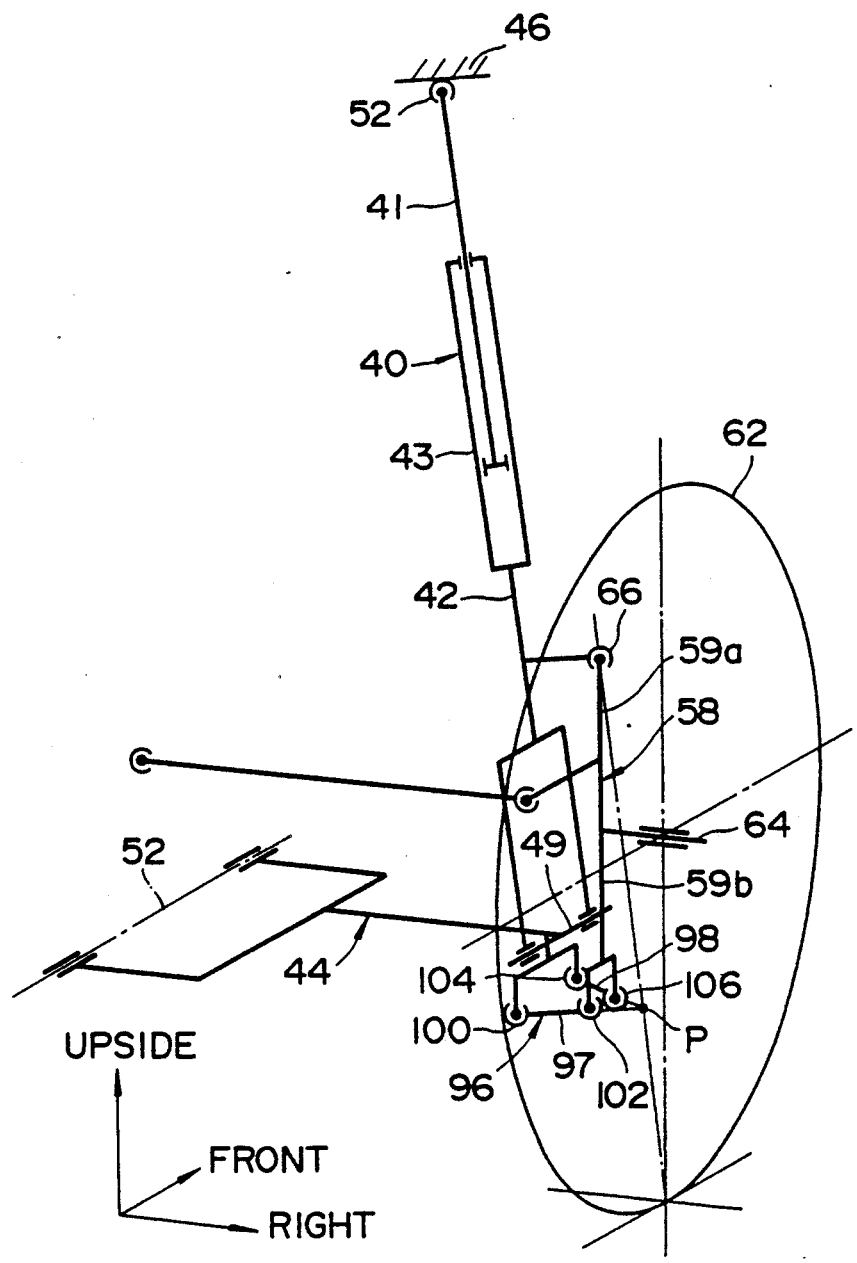

The configuration of the suspension shown in FIG. 10 is the same as that of the suspension shown in FIG. 9 except that the lower strut portion 42 is connected to the suspension arm 44 to be swingable around the axis 49 extending in the longitudinal direction of the vehicle body.

Figure 11:
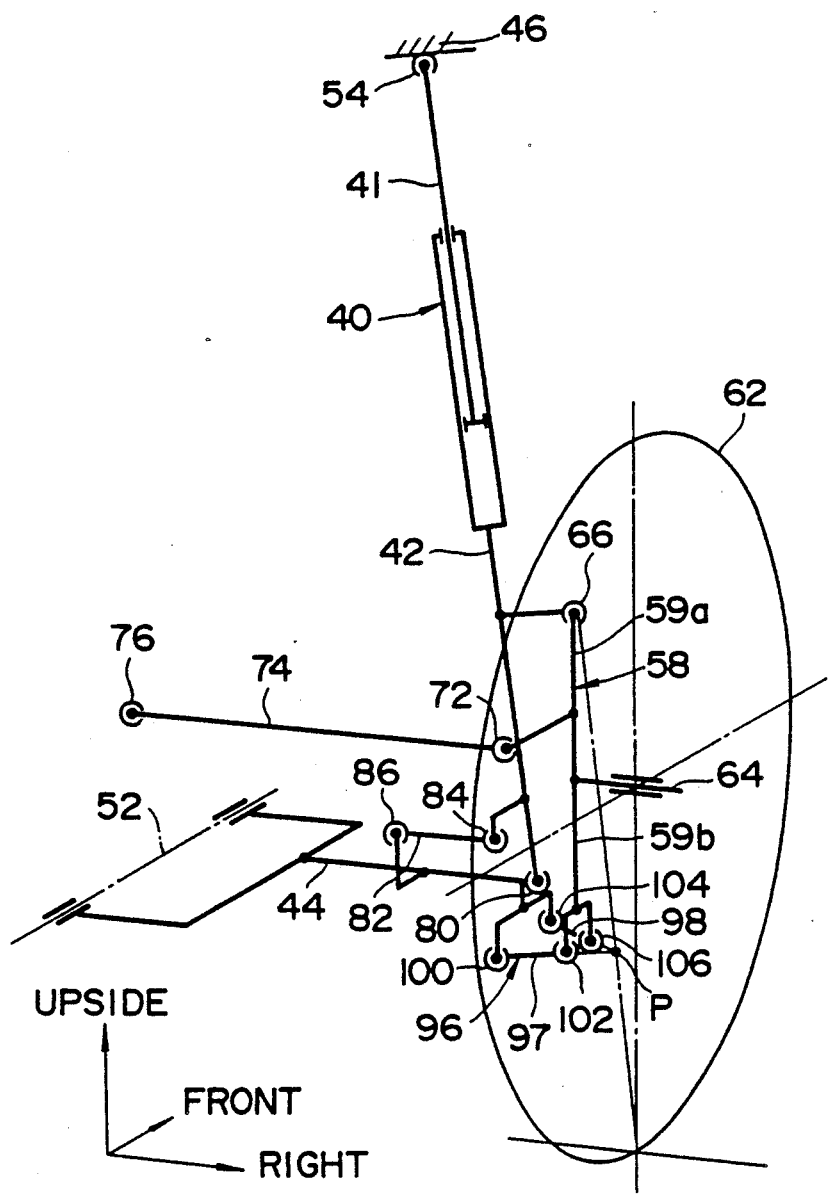

Further, the suspension shown in FIG. 11 uses the control link 96 instead of the control link 56 of the suspension shown in FIG. 4.

Figure 12:
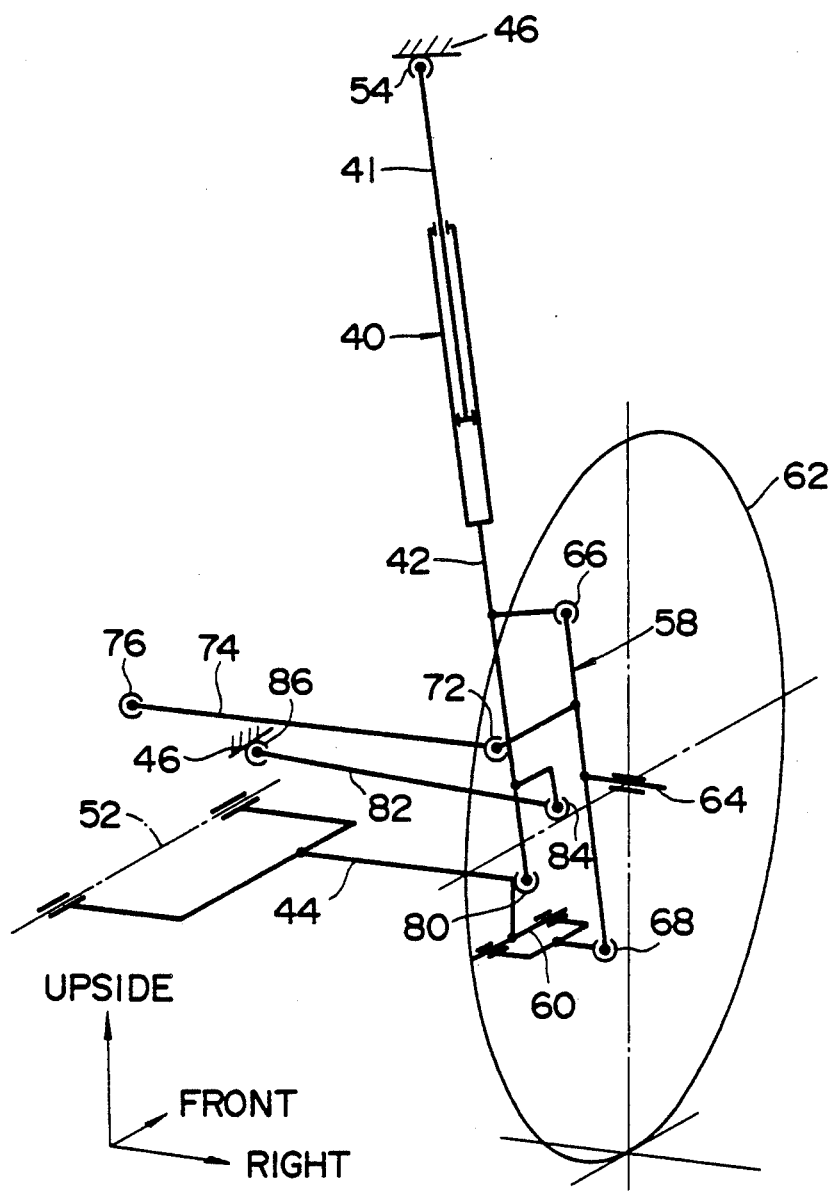

The suspension shown in FIG. 12 is a modification of the suspension shown in FIG. 4, and the inner end of the second control link 82 is swingably connected to the vehicle body 46 through the ball joint 86. The suspension shown in FIG. 11 may be also similarly constituted as the suspension shown in FIG. 12.

Figure 13:
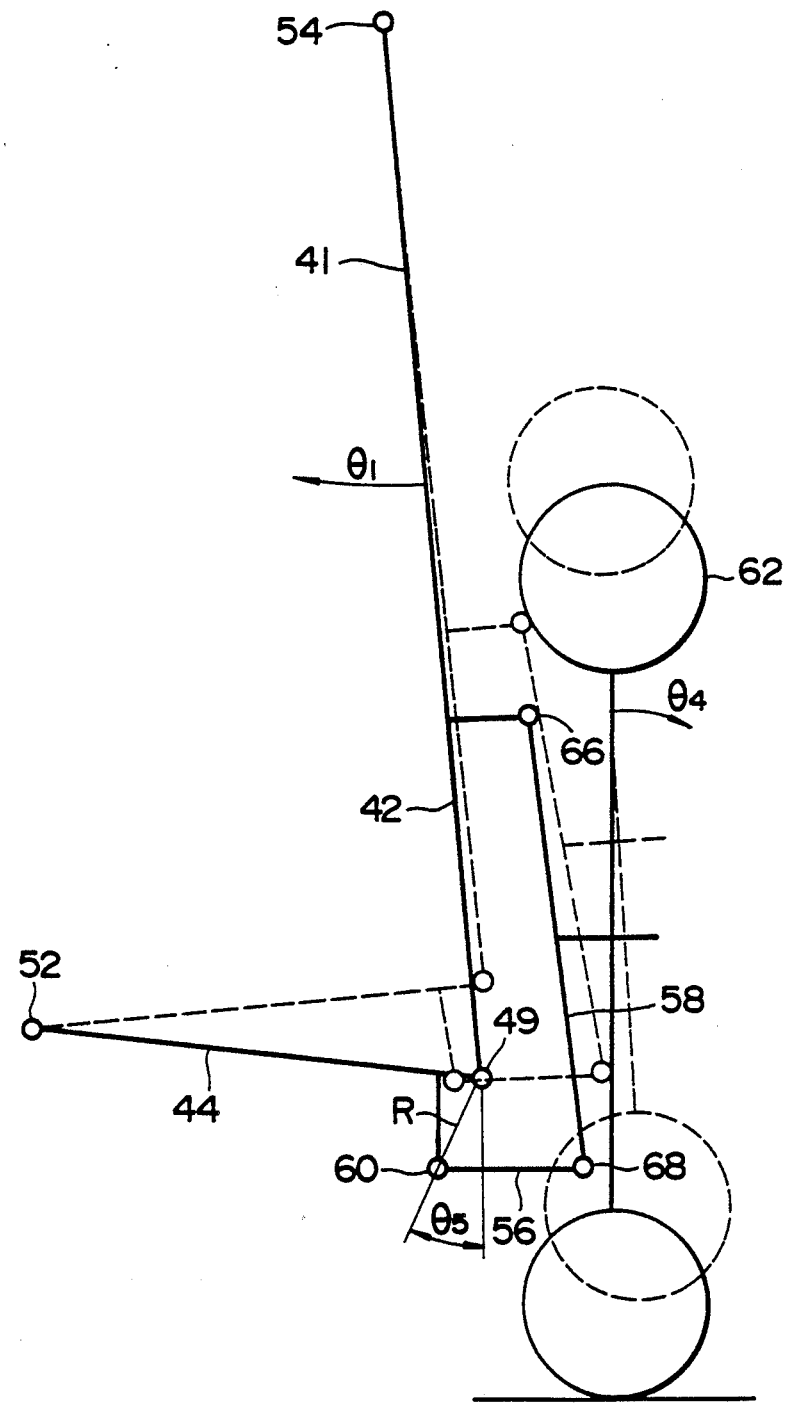
FIGS. 13 and 14 are schematic rear views showing a change in a camber angle according to the suspension shown in FIGS. 1 through 3, respectively.
Figure 14:
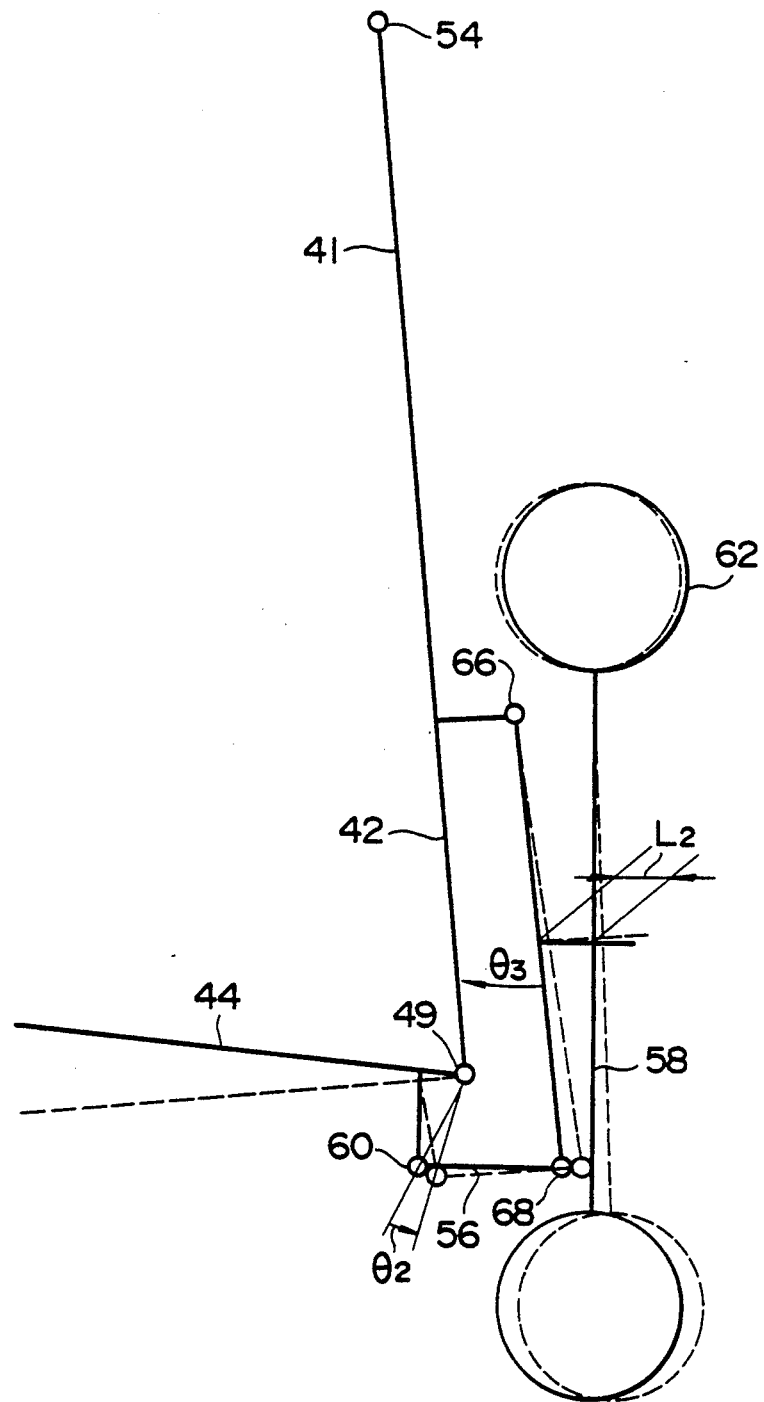

Next will be explained the operation of the embodiments shown in FIGS. 1 through 3 with reference to FIG. 13 as viewed from the back and FIG. 14 showing the movement of each of constituting parts on the basis of the lower strut portion.

Referring to FIGS. 13 and 14, solid lines represent the reference condition and broken lines represent the bounding condition. When the upper strut portion 41 rotates by $\theta_1$ about the ball joint 54 clockwise from the reference condition with the bound, the suspension arm 44 rotates by $\theta_2$ about the shaft 49 counterclockwise from the reference condition relative to the lower strut portion 42. Further, since the shaft 60 rotates by $\theta_2$ about the shaft 49 counterclockwise relative to the lower strut portion 42 to move the ball joint 68 rightward through the control link 56, the wheel carrier 58 rotates by $\theta_3$ about the ball joint 66 clockwise from the reference condition relative to the lower strut portion 42. Further, the tire 62 rotates by $\theta_4$ clockwise from the reference condition.

Assuming that each angle directed to the direction as noted above is set to be a positive value, the relationship represented by $\theta_4 = \theta_1 + \theta_3$ is established, where $\theta_4$ represents the change in camber obtained by the present invention. The conventional strut type suspension provides only the change in camber of $\theta_1$, whereas the present invention provides the change in camber obtained by adding a correction angle of $\theta_3$ to $\theta_1$. The correction angle $\theta_3$ in this case is largely affected by the positional relationship between the shafts 49 and 60, in other words, a distance R between the shafts 49 and 60, and an angle $\theta_5$ made by the straight line connecting the center of the shaft 49 with the center of the shaft 60 and the perpendicular line.

Figure 15:
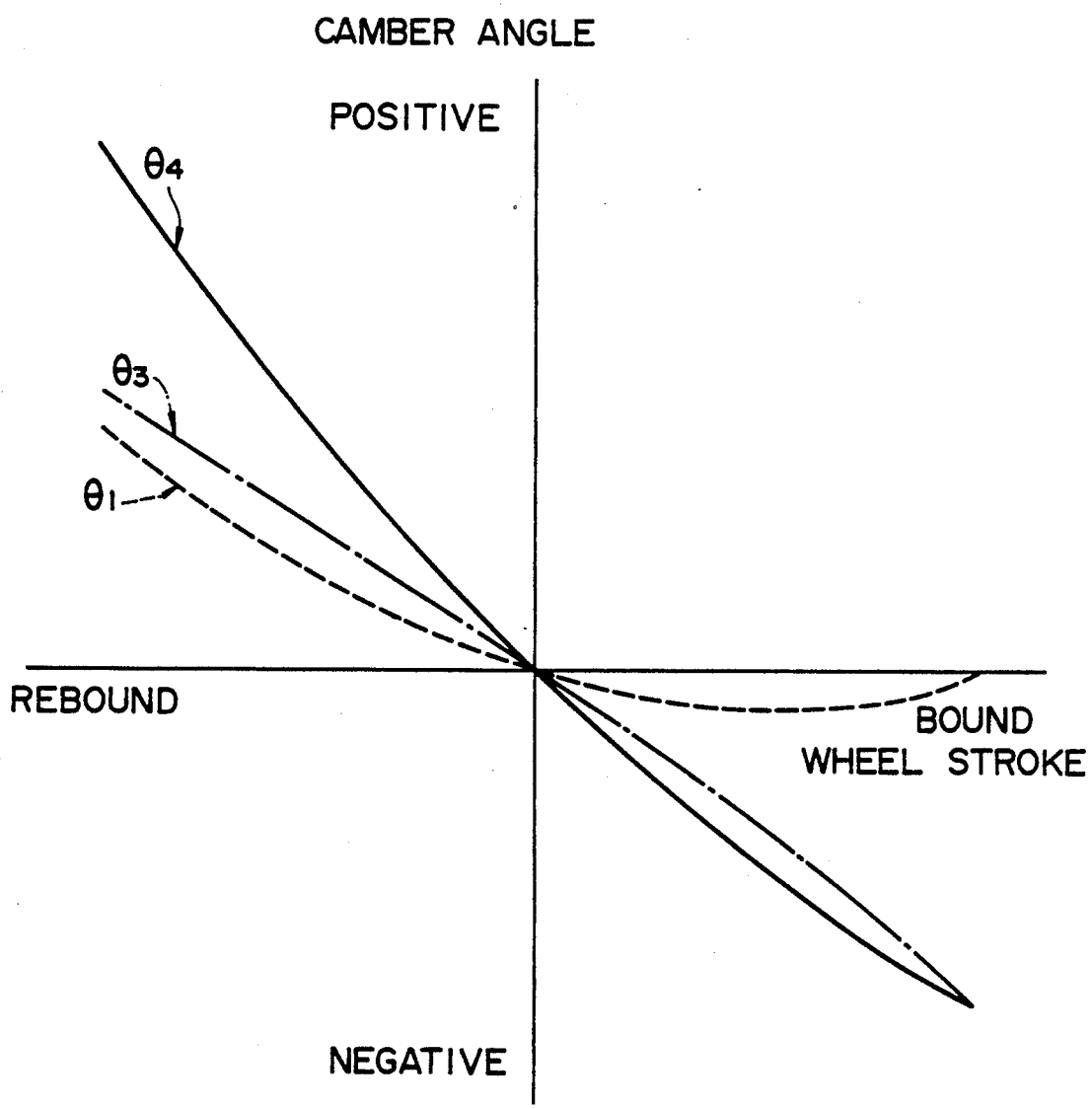
FIG. 15 is a characteristic graph showing the change in camber.

The respective angular changes accompanied by the bound and rebound are shown in FIG. 15. It is understood from FIG. 15 that the camber angle $\theta_4$ according to the present invention is changed approximately linearly from a positive value in rebounding to a negative value in bounding. A broken line $\theta_1$ represents the change in camber angle of the conventional strut type suspension.

Next, referring to the kingpin axis, the swing angle of the ball joint 68 accompanied by the bound comes to be equal with the swing angle of the suspension arm 44 in the conventional strut type suspension, whereas the swing angle of the ball joint 68 according to the present invention is lessened as shown in FIG. 14. Thus, it is possible to dispose the ball joint 68 in the lateral direction of the vehicle body as outward as possible, so that the kingpin inclination may be lessened within a required limit under the condition that the kingpin offset is brought to zero. This means that the IK distance $L_2$ may be lessened.

The operation of the embodiment shown in FIG. 4, in which the second control link 82 is connected to the suspension arm 44 will be explained with reference to FIG. 5 as viewed from the back. In FIG. 5, solid lines represent the reference condition, and broken lines represent the bounding condition. The change in camber angle is identical with that of the previously described embodiment.

When the suspension arm 44 is moved from the reference condition to the bounding condition, the ball joint 86 rotates about the ball joint 80 counterclockwise. At the same time, since the ball joint 84 is connected to the ball joint 86 through the control link 82 and a distance between both ball joints 84 and 86 is restricted, the lower strut portion 42 rotates about the straight line connecting the center of the ball joint 80 with the center of the support 54. The ball joint 66 is displaced to the rearward of the vehicle (to this side in the drawing) by the rotation of the lower strut portion 42. In consequence, as viewed from the side, an angle made by the straight line connecting the center of the ball joint 66 with the center of the ball joint 80 and the perpendicular line, that is, a caster angle is increased.

The operation of the embodiment, in which the second control link 82 is connected to the vehicle body, will be explained with reference to FIG. 7 as viewed from the back.

The ball joint 84, when the bound stroke occurs, moves relative to the vehicle body about the ball joint 86 due to the presence of the control link 82. This movement of the ball joint 84 is represented by vector q. Supposing that the ball joint 84 is not restricted by the control link 82 and thus the lower strut portion 42 does not rotate about the straight line connecting the ball joint 80 with the support 54, the ball joint 84 moves about the instantaneous center b relative to the vehicle body. This movement of the ball joint 84 is represented by vector r. The difference between the vector q and the vector r is absorbed by the rotation of the lower strut portion 42 about the straight line connecting the ball joint 80 with the support 54. The ball joint 66 is displaced to the rearward of the vehicle body by the rotation of the lower strut portion 42.

Figure 16:
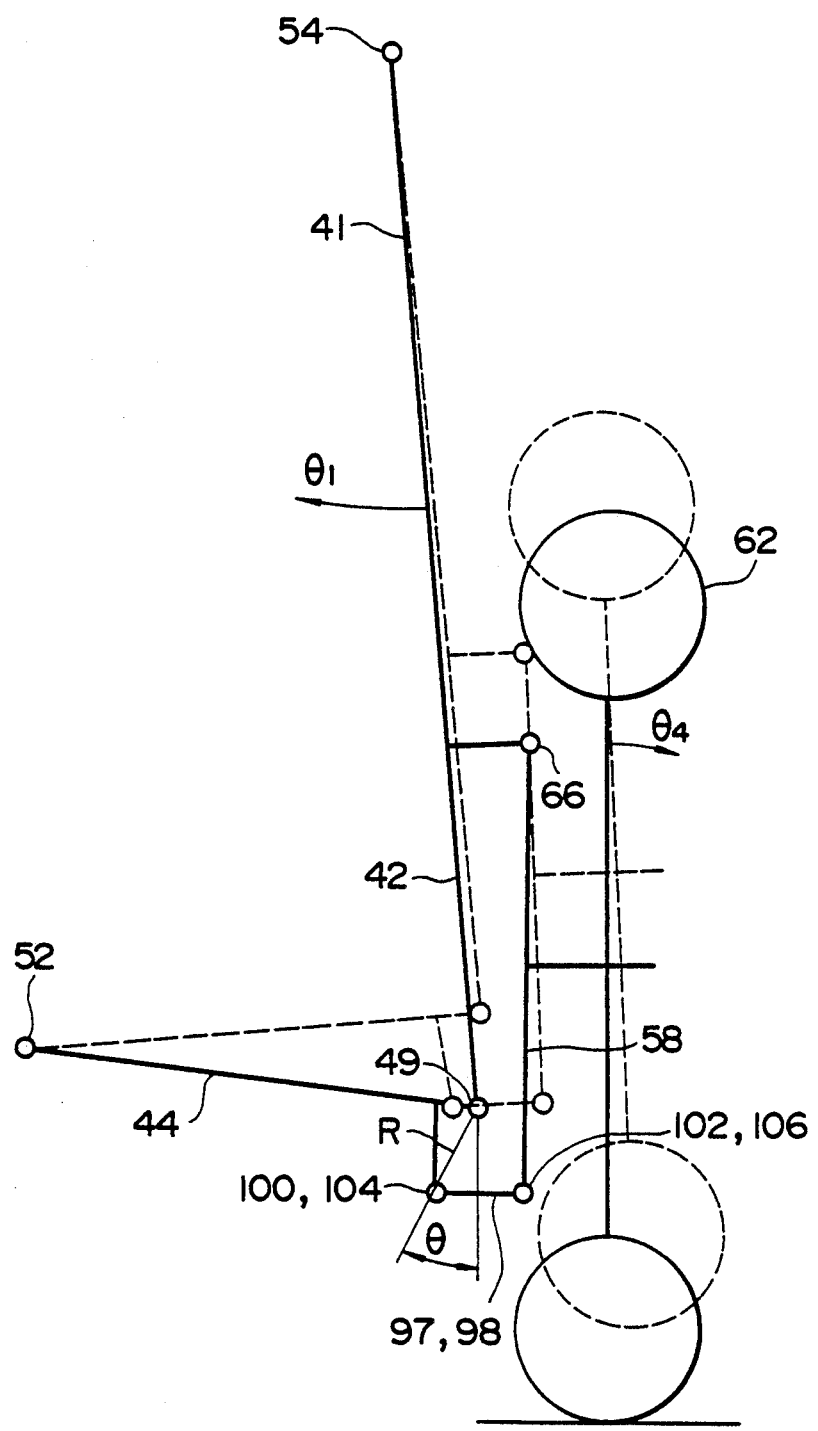
FIGS. 16 through 18 are schematic rear views showing the change in a camber angle and a kingpin axis according to the suspensions shown in FIGS. 9 and 10, respectively.
Figure 17:
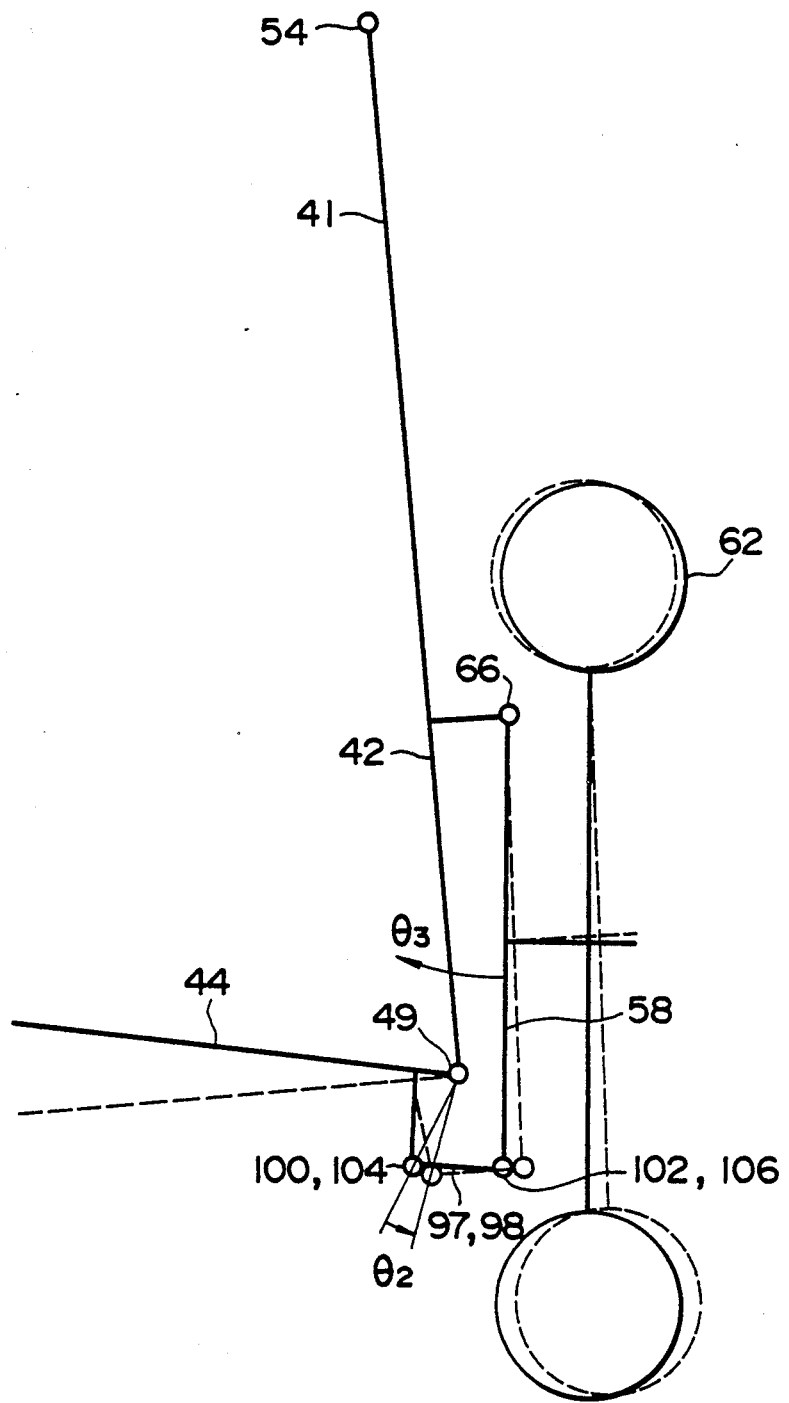

The embodiment shown in FIG. 9 is operated as shown in FIG. 16 as viewed from the back and FIG. 17 showing the movement of each of constituting parts on the basis of the lower strut portion. Since the solid lines and the broken lines represent the reference condition and the bounding condition respectively and the respective angles measured from the reference condition are similar to those of the previously described embodiments, the detailed description thereof will be omitted. In FIGS. 16 and 17, the ball joints 100, 104 are shown instead of the shaft 60, the rods 97, 98 are shown instead of the control link 56, and the ball joints 102, 106 are shown instead of the shaft 68.

Figure 18:
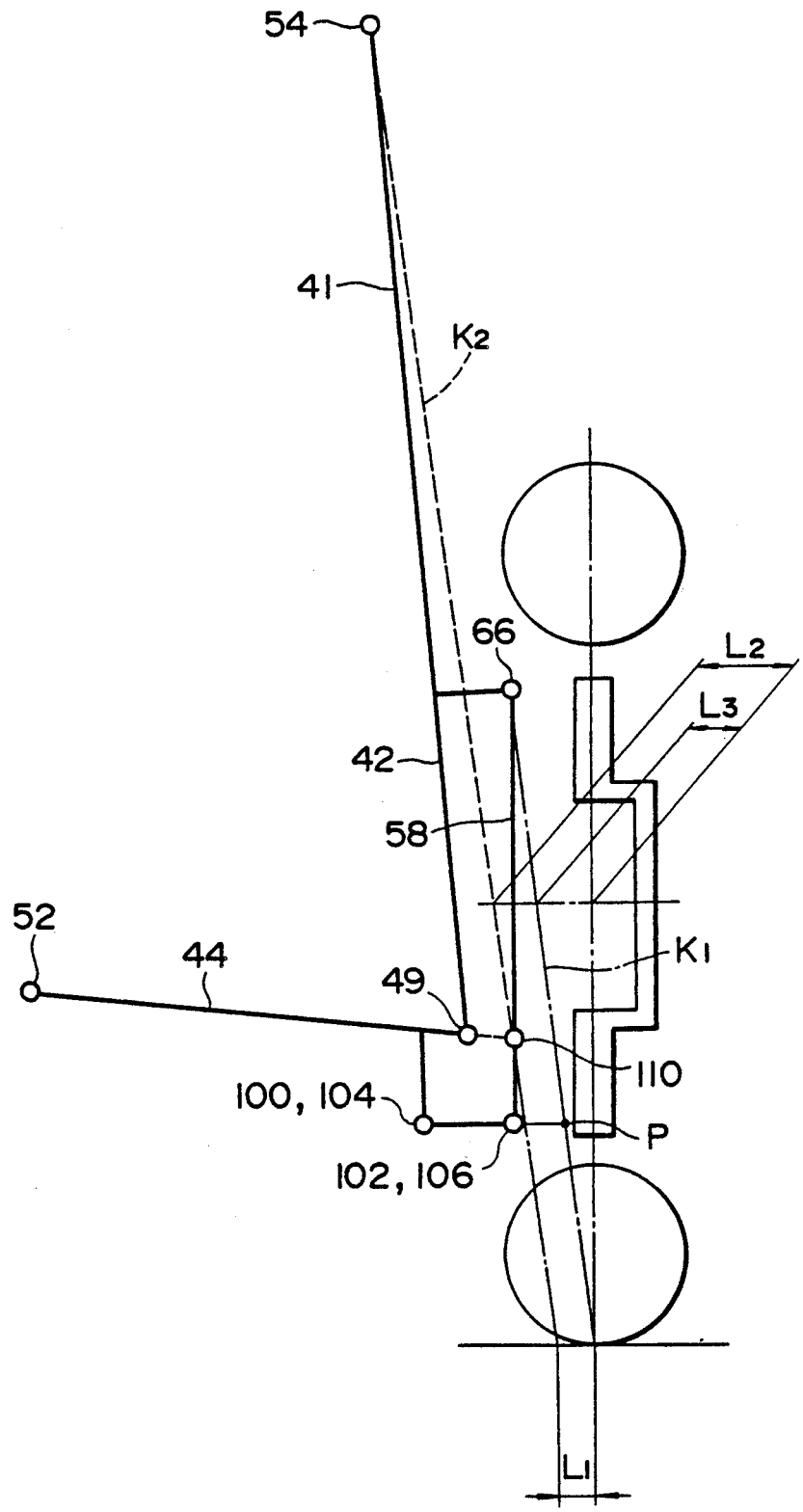

Referring to FIG. 18, in which the kingpin axis of the strut type suspension according to the present invention is compared with that of the conventional strut type suspension, the kingpin axis $K_1$ of the present invention is provided as the line connecting the center of the upper ball joint 66 of the wheel carrier with the imaginary rotary center P, whereas the kingpin axis $K_2$ of the conventional strut type suspension is provided as the line connecting the center of the ball joint 54 disposed on the connection of the upper strut portion 41 and the vehicle body with the center of the ball joint 110 disposed on the connection of the suspension arm 44 and the lower portion of the wheel carrier 58. As is apparent from FIG. 18, the kingpin offset of the present invention is brought to zero, whereas the kingpin offset of the conventional strut type suspension corresponds to $L_1$. The IK distance of the present invention corresponds to $L_3$, whereas the conventional distance corresponds to $L_2$ larger than $L_3$.

Next, the operation and effect of the present invention will be confirmed from different points of view.

Figure 19:
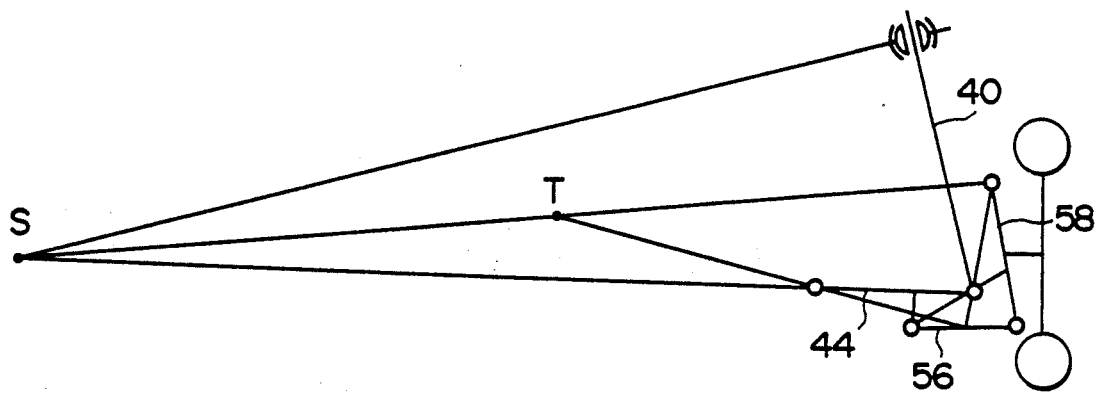
FIGS. 19 and 20 are schematic views showing the effect of the strut type suspension according to the present invention, respectively.

Referring to FIG. 19, the instantaneous center of the wheel carrier 58 relative to the vehicle body in the present invention comes to a point T, whereas the instantaneous center of the wheel carrier in the conventional strut type suspension comes to a point S. The instantaneous center of the present invention comes close to the wheel carrier 58. Accordingly, the change in camber angle of the wheel carrier as viewed from the vehicle body is increased in the case of the present invention rather than that in the conventional strut type suspension.

Figure 20:
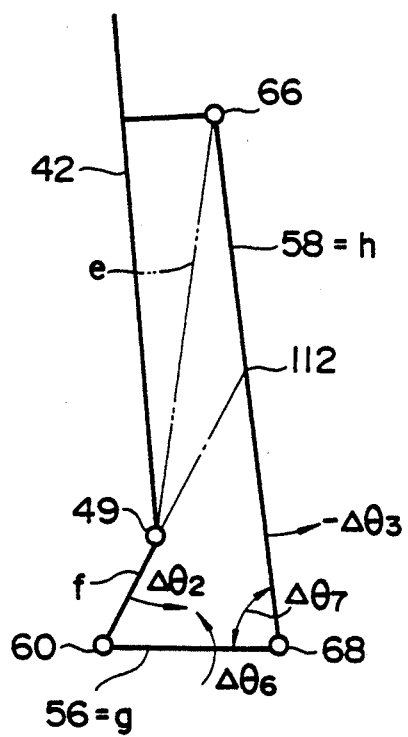
Figure 21:
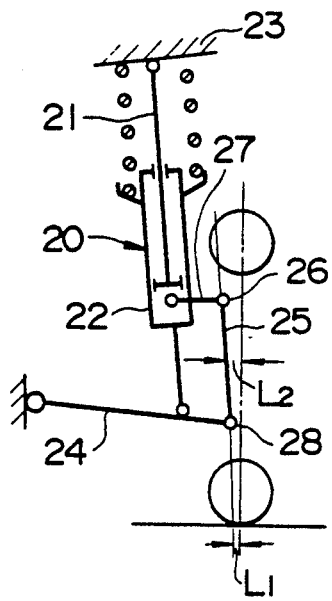
FIGS. 21 and 22 are schematic views showing a prior art strut type suspension, respectively.
Figure 22:
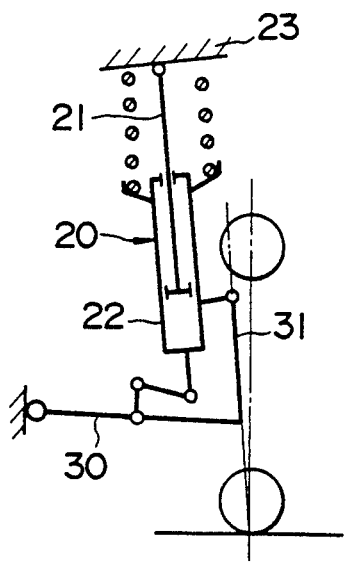

Referring to FIG. 20, the straight line connecting the shaft 49 with the ball joint 66 is defined as e, the straight line connecting the shaft 49 with the shaft 60 is defined as f, the control link 56 is defined as g, and the wheel carrier 58 is defined as h. The instantaneous center of the member g relative to the member e coincides with an intersection 112 of the extension of the member f and the member h.

When the swing angle $\Delta\theta_6$ of the member g is represented by the use of $\Delta\theta_2$, $\Delta\theta_6$ comes to as follows:

$$\Delta\theta_6 = \frac{l(49-60)}{l(60-112)} \Delta\theta_2$$

where l(i-j) represents the distance between i and j.

On the other hand, the relationship is found between $\Delta\theta_6$ and $-\Delta\theta_3$ as follows:

$$-\Delta\theta_3 = \frac{l(68-112)}{l(66-68)} \Delta\theta_6$$

and the following relationship is also obtained:

$$\Delta\theta_7 = \Delta\theta_3 + \Delta\theta_6$$

When $\Delta\theta_7$ is represented by the use of $\Delta\theta_2$, $\Delta\theta_7$ comes to as follows:

$$\Delta\theta_7 = \left( -\frac{l(49-60)}{l(66-68)} \times \frac{l(68-112)}{l(60-112)} + \frac{l(49-60)}{l(60-112)} \right)\Delta\theta_2$$

Where since the member f and the member h are disposed to be substantially perpendicular, l(60-112) is substantially equal with l(68-112), even if the member g is inclined. Consequently, the following relationship is obtained:

$$\frac{l(68-112)}{l(60-112)} \approx 1$$

Constructionally, l(49-60) is shorter than l(60-112) and l(66-68), the following relationships are obtained:

$$\frac{l(49-60)}{l(60-112)} < 1$$

$$\frac{l(49-60)}{l(60-68)} < 1$$

$$\therefore \frac{\Delta\theta_7}{\Delta\theta_2} < 1$$

As a result, it is found that the swing angle of the ball joint 68 of the present invention in smaller than that of the conventional strut type suspension.

What is claimed is:

1. A strut type suspension, in which a strut has an upper strut portion and a lower strut portion capable of sliding relative to the upper strut portion, said upper strut portion is swingably connected to a vehicle body, and said lower strut portion is swingably connected to a suspension arm extending in a lateral direction of the vehicle body, comprising:
   a wheel carrier having an upper portion located above a rotary axis of a wheel and a lower portion located below said rotary axis, said upper portion being swingably connected to said lower strut portion through a ball joint; and
   a control link having one end connected to said suspension arm, said end adapted to be swingable around an axis extending in a longitudinal direction of the vehicle body and the other end swingably connected to said lower portion of said wheel carrier,
   wherein the connection point of said control link and said suspension arm is provided in such a position as to be displaced outward in the lateral direction of the vehicle body relative to the connection point of said lower strut portion and said suspension arm as said suspension arm is swung in a bounding direction from a reference condition.

2. A strut type suspension as claimed in claim 1, further comprising a ball joint disposed in a connection of said lower portion of the wheel carrier and said control link, and wherein a kingpin axis is provided as a line connecting the center of the ball joint disposed at the upper portion of the wheel carrier with the center of the ball joint disposed at the lower portion of the wheel carrier.

3. A strut type suspension, in which a strut has an upper strut portion and a lower strut portion capable of sliding relative to the upper strut portion, said upper strut portion is swingably connected to a vehicle body, and said lower strut portion is swingably connected to a suspension arm extending in a lateral direction of the vehicle body, comprising:
   a wheel carrier having an upper portion located above a rotary axis of a wheel and a lower portion located below said rotary axis, said upper portion being swingably connected to said lower strut portion through a ball joint; and a control link having one end connected to said suspension arm, said end adapted to be swingable around an axis extending in a longitudinal direction of the vehicle body and the other end swingably connected to said lower portion of said wheel carrier, wherein a ball joint is disposed in a connection of said lower portion of the wheel carrier and said control link, wherein a kingpin axis is provided as a line connecting the center of the ball joint disposed at the upper portion of the wheel carrier with the center of the ball joint disposed at the lower portion of the wheel carrier, wherein the connection point of said control link and said suspension arm is provided in such a position as to be displaced outward in the lateral direction of the vehicle body relative to the connection point of said lower strut portion and said suspension arm as said suspension arm is swung in a bounding direction from a reference condition, and wherein said lower strut portion of the strut is connected to said suspension arm to be swingable around an axis extending in a longitudinal direction of the vehicle body and around an axis extending in the lateral direction of the vehicle body.

4. A strut type suspension as claimed in claim 2, wherein said lower strut portion of the strut is connected to said suspension arm to be swingable around an axis extending in a longitudinal direction of the vehicle body.

5. A strut type suspension as claimed in claim 2, further comprising a second control link which has one end swingably connected to said lower strut portion through a ball joint and the other end swingably connected to one of the suspension arm and the vehicle body through a ball joint, and wherein said lower strut portion of the strut is connected to said suspension arm through a ball joint 6. A strut type suspension, in which a strut has an upper strut portion and a lower strut portion capable of sliding relative to the upper strut portion, said upper strut portion is swingably connected to a vehicle body, and said lower strut portion is swingably connected to a suspension arm extending in a lateral direction of the vehicle body, comprising:

a wheel carrier having an upper portion located above a rotary axis of a wheel and a lower portion located below said rotary axis, said upper portion being swingably connected to said lower strut portion through a ball joint; and a control link having one end connected to said suspension arm, said end adapted to be swingable around an axis extending in a longitudinal direction of the vehicle body and the other end swingably connected to said lower portion of said wheel carrier, wherein the connection point of said control link and said suspension arm is provided in such a position as to be displaced outward in the lateral direction of the vehicle body relative to the connection point of said lower strut portion and said suspension arm as said suspension arm is swung in a bounding direction from a reference condition, wherein said control link consists of two rods, each rod having an inner end swingably connected to said suspension arm through a ball joint and an outer end swingably connected to said lower portion of the wheel carrier through a ball joint, and wherein a kingpin axis is provided as a line connecting the center of the ball joint disposed at the upper portion of the wheel carrier with the intersection of extensions of two axes of the rods.

7. A strut type suspension as claimed in claim 6, wherein said lower strut portion of the strut is connected to said suspension arm to be swingable around an axis extending in a longitudinal direction of the vehicle body and around an axis extending in the lateral direction of the vehicle body.

8. A strut type suspension as claimed in claim 6, wherein said lower strut portion of the strut is connected to said suspension arm to be swingable around an axis extending in a longitudinal direction of the vehicle body.

9. A strut type suspension as claimed in claim 6, further comprising a second control link which has one end swingably connected to said lower strut portion through a ball joint and the other end swingably connected to one of the suspension arm and the vehicle body through a ball joint, and wherein said lower strut portion of the strut is connected to said suspension arm through a ball joint.

* * * * *